US00RE46904E

(19) United States
(12) Reissued Patent
Wells

(10) Patent Number: US RE46,904 E
(45) Date of Reissued Patent: Jun. 19, 2018

(54) ELECTRICAL CONNECTOR

(71) Applicant: Connec Limited, New South Wales (AU)

(72) Inventor: Mark Wells, Dudley (AU)

(73) Assignee: CONNEC LIMITED, Rushcutters Bay (AU)

(21) Appl. No.: 14/751,912

(22) Filed: Jun. 26, 2015

Related U.S. Patent Documents

Reissue of:
(64) Patent No.: 7,329,156
Issued: Feb. 12, 2008
Appl. No.: 10/542,702
PCT Filed: Jan. 20, 2004
PCT No.: PCT/AU2004/000065
§ 371 (c)(1),
(2) Date: Mar. 24, 2006
PCT Pub. No.: WO2004/066453
PCT Pub. Date: Aug. 5, 2004

(30) Foreign Application Priority Data

Jan. 20, 2003 (AU) ..... 2003900291
May 9, 2003 (AU) ..... 2003902257

(51) Int. Cl.
*H01R 13/42* (2006.01)
*H01R 13/20* (2006.01)
*H01R 13/207* (2006.01)
*H01R 13/639* (2006.01)

(52) U.S. Cl.
CPC ..... *H01R 13/20* (2013.01); *H01R 13/207* (2013.01); *H01R 13/639* (2013.01)

(58) Field of Classification Search
CPC ..... H01R 13/20; H01R 13/207; H01R 13/639
See application file for complete search history.

(56) References Cited

U.S. PATENT DOCUMENTS 2,967,289 A 1/1961 Day
3,183,476 A 5/1965 Sack et al.
3,761,870 A 9/1973 Drezin et al.
4,775,335 A 10/1988 Havel
5,624,288 A 4/1997 Becker
5,713,765 A * 2/1998 Nugent ..... 439/700
(Continued)

FOREIGN PATENT DOCUMENTS

CA 2193795 6/1998
DE 3345128 7/1984
(Continued)

*Primary Examiner* — Albert J Gagliardi
(74) *Attorney, Agent, or Firm* — Allen Dyer Doppelt & Gilchrist

(57) ABSTRACT

The present invention provides an electrical connector for connecting a core of a machine cable (37) to a pin (28) or a socket (32) of an electrical connection device. The connector has a first part and a second part. The first and second parts have first and second locking surfaces respectively and first and second separate contact surfaces (50, 52). The second part further includes a projection for securing the core of the machine cable and which is electrically connected to the second contact surface. The contact surfaces are so arranged that when the locking surfaces are interlocked, the contact surfaces are in electrical contact with each other so that an electrical contact is established between the core of the machine cable and the pin or socket.

15 Claims, 4 Drawing Sheets

(56) References Cited

U.S. PATENT DOCUMENTS

| | | | | |
|---|---|---|---|---|
| 5,980,335 | A * | 11/1999 | Barbieri et al. | 439/824 |
| 6,524,140 | B2 * | 2/2003 | Takagi et al. | 439/700 |
| 6,676,452 | B2 * | 1/2004 | Bolen et al. | 439/743 |

FOREIGN PATENT DOCUMENTS

| | | |
|---|---|---|
| DE | 3604093 | 8/1987 |
| DE | 40 23 073 | 1/1992 |
| DE | 29607505 | 7/1996 |
| GB | 2230389 | 10/1990 |
| GB | 2 277 207 | 10/1994 |
| JP | 08-315924 | 11/1996 |

* cited by examiner

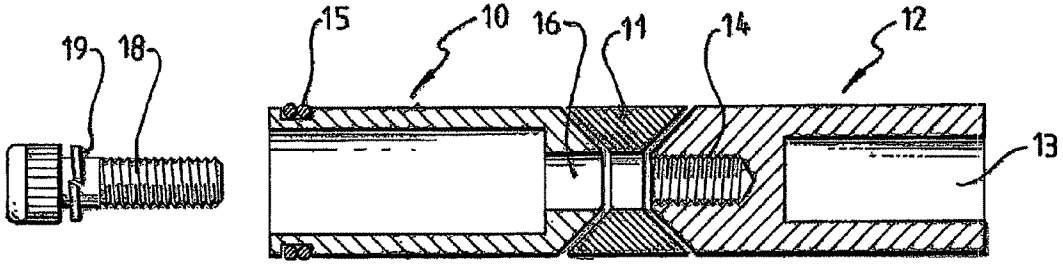
*Fig. 1* *Prior Art*
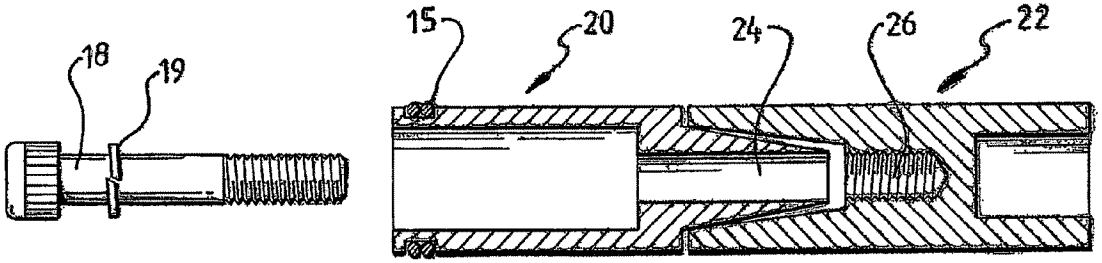
*Fig. 2* *Prior Art*

ELECTRICAL CONNECTOR

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application claims the benefit of International Application No. PCT/AU2004/000065, filed 20 Jan. 2004 which claims the benefit of Australian Application No. 2003900291, filed 20 Jan. 2003 and Australian Application No. 2003902257, filed 9 May 2003, the disclosures of which are hereby incorporated herein in their entireties by reference.

FIELD OF THE INVENTION

The present invention broadly relates to an electrical connector for connecting a core of a machine cable to a pin or a socket of an electrical connection device. Throughout this specification the term "machine cable" is used for any machine, reeling or trailing cable that is arranged for delivery of power to mobile machinery such as large machinery in petroleum or mining industry. The term "connector" is used for any connector including a plug, lug, electrical adaptor, coupler or receptacle.

BACKGROUND OF THE INVENTION

Machine cables are typically used to provide an electrical connection for mobile electrical machines. For example, in the mining or petroleum industry often large electrical machinery is used and each machine cable may have to provide power in the order of a few hundred kilowatts. Typically such power is delivered with a voltage of one or more kilovolts. The cables usually comprise a plurality of cores and are connected using connectors having sockets and pins.

FIG. 1 shows a cross-sectional representation of an electrical connector for connecting a socket with a core of such a machine cable. The Figure shows the socket 10 arranged to receive a pin (not shown). The Figure also shows a thimble 12 which has an open end-portion 13 arranged to receive the core of the machine cable. Fingers of the socket 10 are biased by spring 15 so that an electrical connection with the pin may be achieved. However, the biasing force of the spring 15 may decay over time and it may be necessary to replace the spring 15 and/or the socket 10 from time to time. For this purpose the socket is realisable connected to the thimble 12. The thimble 12 has a threaded portion 14 and the socket 10 has a bore 16. The threaded portion 14 and the bore 16 are arranged to receive stainless steel screw 18 which engages socket 10 and thimble 12 via intermediate part 11. To reduce the likelihood that the stainless steel screw 18 may loosen over time, the stainless steel screw 18 is inserted with a spring washer 19. Socket 10 and thimble 12 have matching conical contact surfaces that match those of intermediate part 11.

FIG. 2 shows a variation of the connector shown in FIG. 1. In this case contact surfaces of socket 20 and thimble 22 do not match when the device is dissembled. However, when the stainless screw 18 is inserted into the bore 24 of the socket 20 and received by the threaded portion 26 of the thimble 22, the contact surface of the socket 20 bents the contact surface of the thimble 22 outwards.

Both prior art devices have the disadvantage that the screw has to be relatively small as the screw head is positioned within the socket. However, the relatively small screw often does not provide sufficient strength for the connection of the socket with the thimble. Further, the contact surfaces are relatively small and the additional pathway that is provided for the current through the screw itself is often not satisfactory. The current has to pass through up to three interfaces (between socket, intermediate part and thimble or, alternatively, between socket and spring washer, between spring washer and screw head and between the thread of the screw and the thread of the bore) and contact potentials, corrosion and contamination may result in contact resistivity at every interface. Further, the screw and the spring washer themselves may not have satisfying electrical properties.

SUMMARY OF THE INVENTION

The present invention provides an electrical connector arranged for connecting a core of a machine cable to a pin or a socket of an electrical connection device, the connector comprising:

a first part having a first locking surface and having a further surface that forms a first contact surface, the first part further including a pin or a socket which is electrically connected to the first contact surface, a second part having a second locking surface arranged to interlock with the first locking surface and having a further surface that forms a second contact surface which is arranged to contact the first contact surface, the second part further including a projection for securing the core of the machine cable to the second part, the projection being electrically connected to the second contact surface, wherein the contact surfaces are arranged so that, when the locking surfaces are interlocked, the contact surfaces are in electrical contact with each other so that an electrical contact is established between the core of the machine cable and the pin or socket.

An advantage of the present invention is that the first part and the second part can be held together without any additional part which makes the assemblement of the device relatively easy. Further, the assembled device may only have one interface which is of advantage for electrical properties of the device. Prior art devices typically use a stainless steel screw which is inserted through bores of the socket and the thimble to hold together the thimble and the socket (see FIG. 1). Such screws are of relatively low electrically conductivity and their usage therefore increases the electrical resistivity for current conducted through the conductor. The above-defined connector does not require such a screw and consequently the cross-sectional area through which electricity can be conducted with a relatively low specific resistance may be increased compared with prior art devices.

The electrical connection device typically is arranged for delivery of a power of a few hundred kilowatts. Further, the electrical connection device typically is arranged for delivery of power having an associated voltage of one or more kilovolts.

The first locking surface typically is positioned between the first contact surface and the pin or socket.

The second contact surface typically is positioned between the second locking surface and the projection.

The first part may have opposing first and second end-portions, the first end-portion may include a socket and the second end-portions may include the first contact surface.

Alternatively, the first end-portion may include a pin. The second end-portion of the second part may include the second locking surface and the second end-portion of the first part may include the first locking surface.

At least one of the first part and the second part may be integrally formed and typically both the first part and the second part are each integrally formed.

In one embodiment the first locking surface comprises a first threaded portion and the second locking surface comprises a second threaded portion arranged to receive the first threaded portion.

For example, the first threaded portion may be a cylindrical portion having an outer thread and the second threaded portion may be a complimentary threaded bore arranged to receive the cylindrical portion.

Alternatively, the second threaded portion may be a cylindrical portion having an outer thread and the first threaded portion is a complimentary threaded bore arranged to receive the cylindrical portion.

An advantage of this arrangement is that the threaded cylindrical portion and the respective threaded bore may be larger in diameter and consequently mechanically and electrically stronger than those of prior art devices as there is no need to locate a screw and screw head within another part which is a requirement in the prior art (prior art devices are shown in FIGS. 1 and 2). As the threaded cylindrical portion and the respective threaded bore may be larger than in that of the screw and the respective receiving thread of the prior art devices, the mechanical connection and consequently electrical connection between the threaded portions and the contact surfaces may also be of improved.

Electrical contact is established when the contact surfaces are in electrical contact, but may additionally also be established when the locking surfaces are in contact. For example, as the threaded cylindrical portion and the threaded bore can be relatively large, the mechanical connection can be relatively strong and, as a consequence of the stronger mechanical connection and the larger area at which the threaded portions contact, the electrical connection may be improved compared with prior art devices. In a specific embodiment the contact area that is established when the locking surfaces are interlocked is at least as large as the contact area that is established when the contact surfaces are in contact.

Alternatively or additionally, a portion of one of the locking surfaces may be arranged to scrape over a portion of the other locking surface when the locking surfaces interlock.

The first contact surface may have a conical tip and the second contact surface may have a respective conical bore arranged to receive the conical tip of the first contact surface. Alternatively, the first contact surface may have a conical bore and the second contact surface may have a respective conical tip arranged to be received by the conical bore of the first contact surface.

The first and the second contact surfaces may have matching profiles.

The conical tip may have a surface that is not curved or that is outwardly curved and arranged for contact with the conical bore within a ring-like zone near the apex of the curvature. In this case the conical bore may have a surface that is not curved or that has a suitable inwardly or outwardly curved profile. Alternatively, the conical tip may have a surface that is inwardly curved and that is arranged for contact with a suitable inwardly or outwardly curved conical bore. For example, the inwardly or outwardly curved surfaces may have a curvature that has a profile corresponding to a section of a sphere. Each curved surface may also comprise more than one curvatures.

For example, a portion of one of the contact surfaces may be arranged to scrape over a portion of the other contact surface when the locking surfaces interlock whereby the contact surfaces may be cleaned and seated onto each other and therefore a better electrical contact may be established.

The invention will be more fully understood from the following description of specific embodiments. The description is provided with reference to the accompanying drawings.

BRIEF DESCRIPTION OF THE DRAWINGS

FIG. 1 shows a cross-sectional representation of an electrical connector for connecting a core of a machine cable to a socket of an electrical connection device (prior art), FIG. 2 shows a cross-sectional representation of another electrical connector for connecting a core of a machine cable to a socket of an electrical connection device (prior art)

DETAILED DESCRIPTION OF THE PREFERRED EMBODIMENTS

Figure 3:
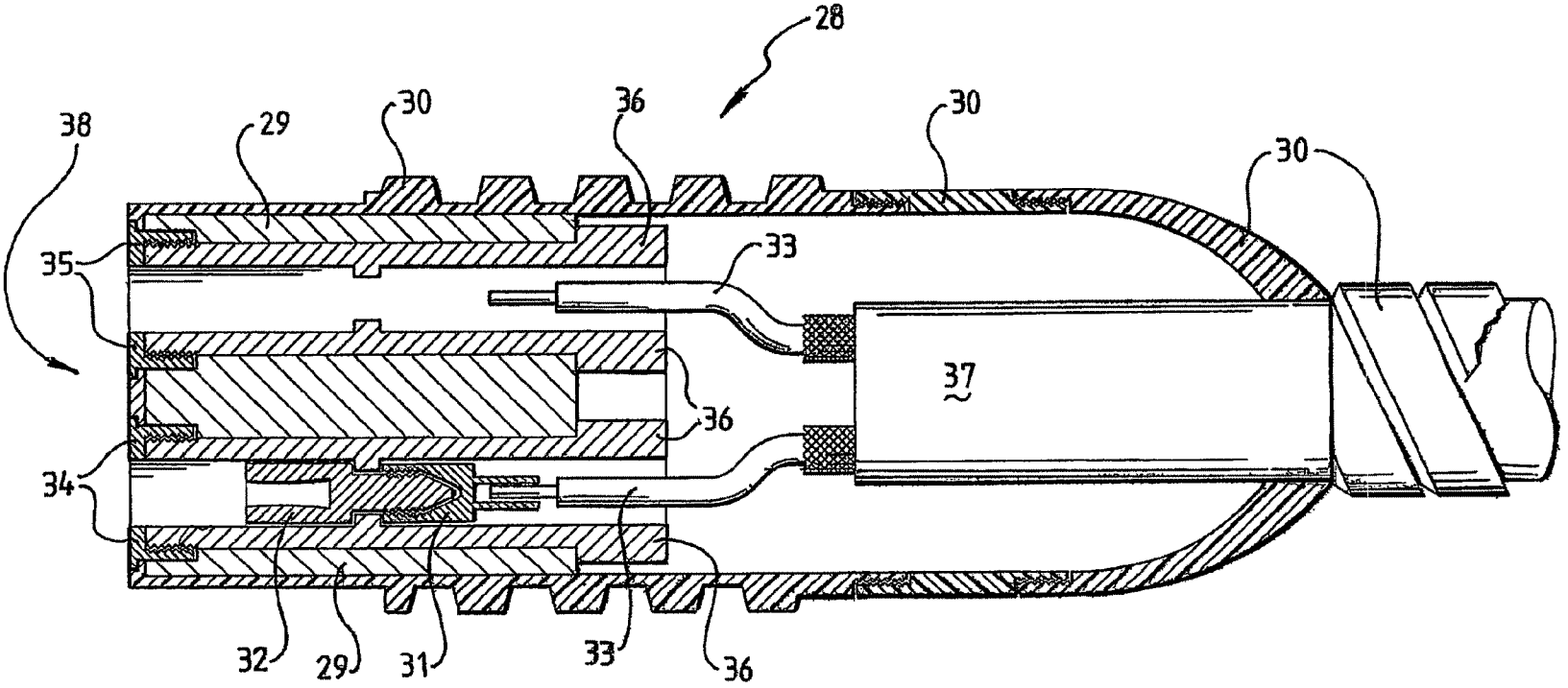
FIG. 3 shows an electrical connector for connecting a core of a machine cable to a socket of an electrical connection device according to a specific embodiment.

Referring to FIG. 3, a plug incorporating an electrical connector according to a specific embodiment is now described. The plug 28 comprises a socket 32 and a thimble 31. In this embodiment, socket 32 and thimble 31 are each integrally formed. The thimble 31 is connected to a core 33 of a machine cable 37. The socket 32 is arranged to receive a pin (not shown) and has a threaded cylindrical portion that is inter-locked with a threaded bore of the thimble 31.

The plug 28 comprises a body 29 that is of substantially cylindrical shape and an outer shell 30 composed of metallic and/or insulating material(s). The plug 28 has an end-face 38 that has three apertures that are defined by nuts such as nuts 34 and 35. From each aperture an insulating sleeve 36 projects inwardly. Thimble 31 has a key (not shown) and sleeve 36 has a corresponding key way (not shown) arranged so that rotation of the thimble 31 in the sleeve 36 can be avoided whereby screwing of the socket 32 into the thimble 31 is simplified. Alternatively, the sleeve 36 may have a key and the thimble 31 may have a corresponding key way arranged so that rotation of the thimble 31 is avoided when the socket 32 is screwed into the thimble 31.

Figure 4:
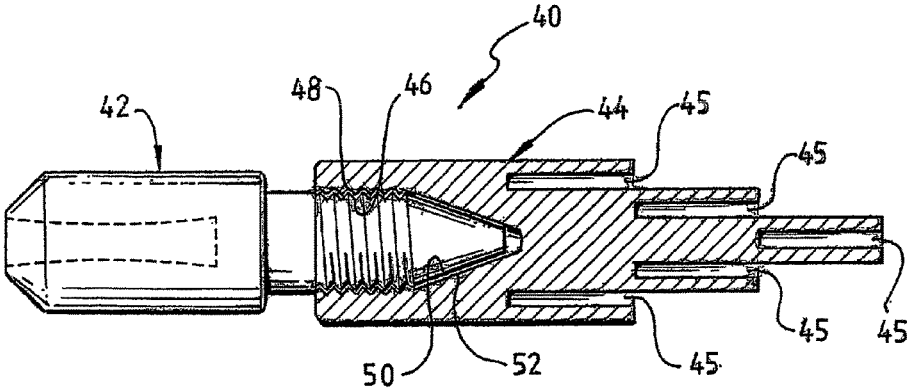
FIG. 4 shows an electrical connector for connecting a core of a machine cable to a socket of an electrical connection device according to another specific embodiment.

Referring now to FIG. 4, the electrical connection device 40 comprising a socket 42 and a thimble 44 is described in more detail. The socket 42 is arranged to receive a pin (not shown) and the thimble 44 comprises a plurality of recesses 45 arranged to be connected to individual branches of a core of a machine cable (not shown). The socket 42 has a first locking surface which has the form of cylindrical portion 46 having an outer thread. The thimble 44 comprises a complimentary threaded bore 48 arranged to receive the cylindrical threaded portion 46. The outer diameter of the cylindrical threaded portion 46 is relatively large compared with the outer diameter of the socket and it therefore is possible to achieve a relative strong inter-locking of the threaded cylindrical portion with the threaded bore.

The socket 42 has a contact surface 50 and the thimble 44 has a matching contact surface 52. In this example the contact surface 50 is provided in form of a conical tip of the threaded cylindrical portion 46. The thimble 44 has a respective conical extension which provides the contact surface 52 arranged to be in electrical contact with the conical contact surface 50. The contact surface 50 and the contact surface 52 have matching profiles.

Figure 5:
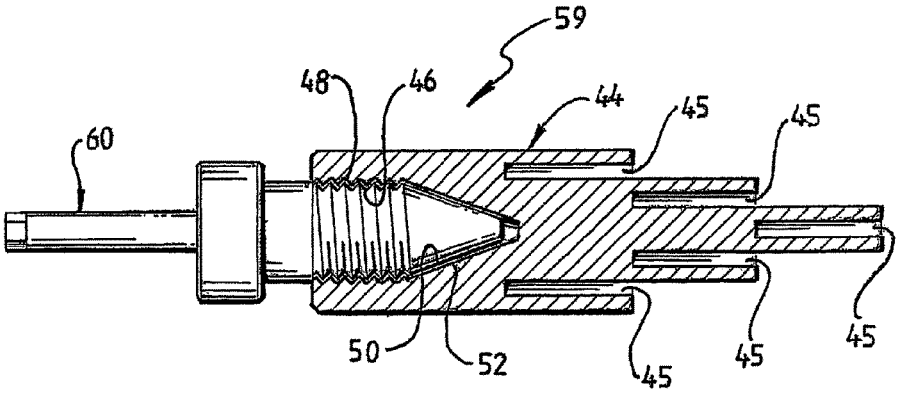
FIG. 5 shows an electrical connector for connecting a core of a machine cable to a pin of an electrical connection device according to a further specific embodiment, and FIGS. 6 (a) and (b) show details of the electrical connector according to yet another specific embodiment.

FIG. 5 shows a variation 59 of the device shown in FIG. 4 comprising a pin 60 instead of the socket in the device shown in FIG. 4. The pin 60 is arranged to receive a socket (not shown) and is interlocked with the thimble 44 in the same way as the socket 42 shown in FIG. 4.

It will be appreciated that the socket 42 of the device 40 shown in FIG. 4 and the pin 60 of the device 59 shown in FIG. 5 can be exchanged. Therefore, a connector such as a plug or receptacle incorporating device 40 and/or 59 shown has the advantage of greater flexibility compared with prior art devices where pins and sockets are not exchangeable (see FIGS. 1 and 2).

Figure 6A:
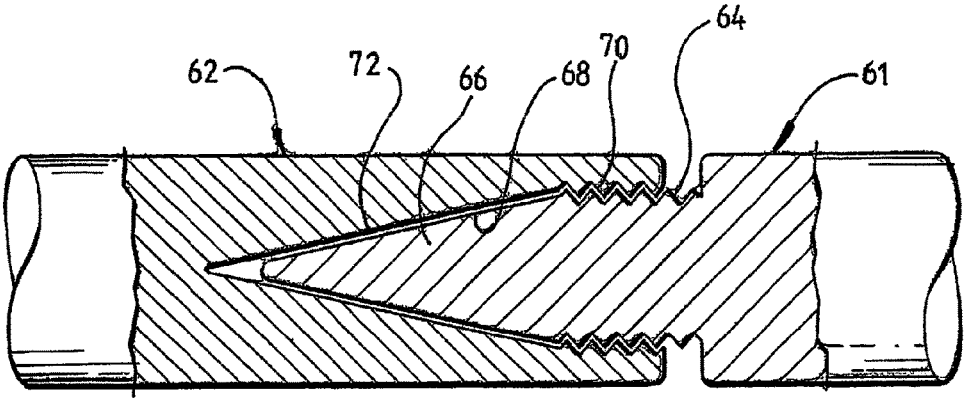
Figure 6B:
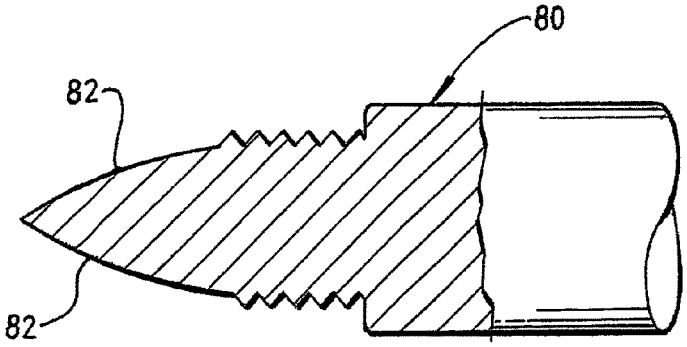

Referring now to FIG. 6 (a), the electrical connection device is now described in further detail. FIG. 6 (a) shows a portion of a socket 61 and a portion of a thimble 62 interlocked with the socket 61. In this embodiment, the socket 61 has a cylindrical portion 64 with outer thread. The cylindrical portion 64 has a conical tip 66 which provides a contact surface 68. The thimble 62 has a threaded bore 70 that has a contact surface 72 in form of a conical bore shaped complimentary to the conical tip 66 of the cylindrical portion 64. If the threaded cylindrical portion 64 is screwed into the threaded bore 70, the conical tip 66 scrapes over the conical contact surface 72 when the socket 61 is interlocked with the thimble 62 whereby the contact surfaces are cleaned and therefore a better electrical contact may be established.

Referring now to FIG. 6 (b), a variation of the electrical connection device is now described. In this case the socket 80 has a conical contact surface 82 that is curved. The area in which electrical contact between the contact surface 82 and the contact surface 72 of the thimble 62 is near within a ring-like zone near the apex of the curvature and may be smaller than that of the device shown in FIG. 6 (a). However, the curved conical contact surface profile 82 may have other advantages such as a progressive cleaning action when the contact surfaces scrape ever each other when the thimble 62 and the socket 80 are being engaged together. Such scraping action may result in one contact surface being seated on the other contact surface which would improve the electrical connection as interfacial resistance can be reduced.

Although the invention has been described with reference to particular examples, it will be appreciated by those skilled in the art that the invention may be embodied in many other forms. For example, the connector may comprise a pin instead of the socket as described in the above embodiments. Also, the thimble may have a threaded cylindrical portion and the socket may have a threaded bore arranged to receive the threaded cylindrical portion. Further, the socket and the thimble may not be integrally formed but may be composed of different parts that are joined.

The invention claimed is:

1. An electrical connector arranged for connecting a core of a machine cable to a pin or a socket of an electrical connection device, the connector comprising:

a first part having a first locking surface and having a further surface that forms a first contact surface, the first part further including a pin or a socket which is electrically connected to the first contact surface, a second part having a second locking surface arranged to interlock with the first locking surface and having a further surface that forms a second contact surface which is arranged to contact the first contact surface, the second part further including a projection for securing the core of the machine cable to the second part, the projection being electrically connected to the second contact surface, wherein the first locking surface comprises a first threaded portion and the second locking surface comprises a second threaded portion arranged to receive the first threaded portion,

[and] wherein the contact surfaces are arranged so that, when the locking surfaces are interlocked, the contact surfaces are in electrical contact with each other so that an electrical contact is established between the core of the machine cable and the pin or socket,

*wherein one of the first or the second contact surfaces has a conical tip and the other one of the first and second contact surface has a conical bore arranged to receive the conical tip, and*

*wherein the conical tip comprises an outwardly curved surface which is arranged for contact with the conical bore within a ring-like zone near the apex of the curvature, or the conical bore comprises an inwardly curved surface which is arranged for contact with the conical tip within a ring-like zone near the apex of the curvature.*

2. The electrical connector as claimed in claim 1 wherein the electrical connection device is arranged for delivery of a power of a few hundred kilowatts.

3. The electrical connector as claimed in claim 1 wherein the electrical connection device is arranged for delivery of power having an associated voltage of one or more kilovolts.

4. The electrical connector as claimed in claim 1 wherein the first locking surface is positioned between the first contact surface and the pin or socket.

5. The electrical connection device as claimed in claim 1 wherein the second contact surface is positioned between the second locking surface and the projection.

6. The electrical connector as claimed in claim 1 wherein the first part has opposing first and second end-portions, the first end-portion including a socket and the second [end-portions] *end portion* including the first contact surface.

7. The electrical connector as claimed in claim 6 wherein [the] *a* second end-portion of the second part includes the second locking surface and the second end-portion of the first part includes the first locking surface.

8. The electrical connector as claimed in claim 1 wherein the first part has opposing first and second end-portions, the first end-portion including a pin and the second [end-portions] *end-portion* including the first contact surface.

9. The electrical connector as claimed in claim 8 wherein [the] *a* second end-portion of the second part includes the second locking surface and the second end-portion of the first part includes the first locking surface.

10. The electrical connector as claimed in claim 1 wherein at least one of the first part and the second part is integrally formed.

11. The electrical connector as claimed claim 1 wherein a portion of one of the contact surfaces is arranged to scrape over a portion of the other contact surface when the locking surfaces interlock.

12. The electrical connector as claimed in claim 1 wherein a portion of one of the locking surfaces is arranged to scrape over a portion of the other locking surface when the locking surfaces interlock.

13. The electrical connector as claimed in claim 1 wherein the first threaded portion is a cylindrical portion having an outer thread and the second threaded portion is a complimentary threaded bore arranged to receive the cylindrical portion.

14. The electrical connector as claimed in claim 1 wherein the second threaded portion is a cylindrical portion having an outer thread and the first threaded portion is a complimentary threaded bore arranged to receive the cylindrical portion.

[15. The electrical connector as claimed in claim 1 wherein the second contact surface has a conical tip and the first contact surface has a respective conical bore arranged to receive the conical tip of the second contact surface.]

[16. The electrical connector as claimed in claim 15 wherein the conical bore comprises an inwardly curved surface which is arranged for contact with the conical tip within a ring-like zone near the apex of the curvature.]

[17. The electrical connector as claimed in claim 1 wherein the first contact surface has a conical tip and the second contact surface has a respective conical bore arranged to receive the conical tip of the first contact surface.]

[18. The electrical connector as claimed in claim 17 wherein the conical tip comprises an outwardly curved surface which is arranged for contact with the conical bore within a ring-like zone near the apex of the curvature.]

[19. The electrical connector as claimed in claim 17 wherein the conical bore comprises an inwardly curved surface which is arranged for contact with the conical tip within a ring-like zone near the apex of the curvature.]

20. The electrical connector as claimed in claim 1 wherein the first and the second contact surfaces have matching profiles.

[21. The electrical connector as claimed in claim 20 wherein the conical tip comprises an outwardly curved surface which is arranged for contact with the conical bore within a ring-like zone near the apex of the curvature.]

* * * * *